United States Patent
Miki et al.

(10) Patent No.: US 8,480,785 B2
(45) Date of Patent: Jul. 9, 2013

(54) METHOD AND APPARATUS FOR RECOVERING INDIUM FROM ETCHING WASTE SOLUTION CONTAINING INDIUM AND FERRIC CHLORIDE

(75) Inventors: Takeo Miki, Osaka (JP); Tamotsu Sugimoto, Osaka (JP); Eiichi Sahashi, Osaka (JP); Takamichi Honma, Osaka (JP); Tomoharu Maeseto, Kobe (JP)

(73) Assignees: Sharp Kabushiki Kaisha, Osaka-shi (JP); Kobelco Eco-Solutions Co., Ltd., Kobe-shi (JP)

( * ) Notice: Subject to any disclaimer, the term of this patent is extended or adjusted under 35 U.S.C. 154(b) by 798 days.

(21) Appl. No.: 12/524,170

(22) PCT Filed: Nov. 19, 2007

(86) PCT No.: PCT/JP2007/072409
§ 371 (c)(1),
(2), (4) Date: Feb. 18, 2010

(87) PCT Pub. No.: WO2008/090672
PCT Pub. Date: Jul. 31, 2008

(65) Prior Publication Data
US 2010/0139457 A1   Jun. 10, 2010

(30) Foreign Application Priority Data
Jan. 23, 2007 (JP) .................. 2007-012824

(51) Int. Cl.
*C22B 3/44* (2006.01)
*C22B 58/00* (2006.01)

(52) U.S. Cl.
USPC ............ 75/724; 75/739; 210/723; 210/738; 210/748.05; 210/786; 266/101

(58) Field of Classification Search
USPC ............ 75/740, 724; 210/723, 738, 748.05, 210/786
See application file for complete search history.

(56) References Cited

U.S. PATENT DOCUMENTS 3,994,721 A * 11/1976 Bienvenu et al. ............... 75/370
4,152,143 A *  5/1979 Kausel et al. .................. 75/730
5,208,004 A      5/1993 Myerson

FOREIGN PATENT DOCUMENTS

JP  61-236611 A  10/1986
JP  6 128664      5/1994

(Continued)

OTHER PUBLICATIONS

JP 2007-270342 A published Oct. 18, 2007, machine English translation.*

(Continued)

*Primary Examiner* — George Wyszomierski
*Assistant Examiner* — Tima M McGuthry Banks
(74) *Attorney, Agent, or Firm* — Oblon, Spivak, McClelland, Maier & Neustadt, L.L.P.

(57) ABSTRACT

It is an object to provide a method and an apparatus for recovering indium, the method and apparatus ensuring that it is unnecessary to recover indium in the form of indium hydroxide, indium can be recovered easily by a filter or the like without handling inferiors and also, the recovery rate of indium is greatly improved. The method includes immersing a precipitation-inducing metal which includes zinc and is made into the form of a solid such that any part coming into view three-dimensionally has a longitudinal length of 2.5 to 10 mm in an etching waste solution containing at least indium and ferric chloride and allowed to stand, thereby allowing indium contained in the etching waste solution to precipitate on the surface of the precipitation-inducing metal based on a difference in ionization tendency between zinc and indium, and detaching the indium precipitated on the surface of the precipitation-inducing metal to recover it.

5 Claims, 5 Drawing Sheets

FOREIGN PATENT DOCUMENTS

| | | | |
|---|---|---|---|
| JP | 10 509212 | | 9/1998 |
| JP | 2001 192709 | | 7/2001 |
| JP | 2004 75463 | | 3/2004 |
| JP | 2004075463 A | * | 3/2004 |
| JP | 2005 342694 | | 12/2005 |
| JP | 2007 9274 | | 1/2007 |
| JP | 2007 270342 | | 10/2007 |
| JP | 2007270342 A | * | 10/2007 |
| WO | WO 96/08585 A1 | | 3/1996 |
| WO | WO 2007/004664 A1 | | 1/2007 |
| WO | WO 2007004664 A1 | * | 1/2007 |

OTHER PUBLICATIONS

Office Action issued May 11, 2012, in Japanese Patent Application No. 2008-554976.
U.S. Appl. No. 12/524,081, filed Jul. 22, 2009, Miki, et al.
Office Action issued Jun. 17, 2011 in Korea Application No. 10-2009-7016518 (With English Translation).

* cited by examiner

METHOD AND APPARATUS FOR RECOVERING INDIUM FROM ETCHING WASTE SOLUTION CONTAINING INDIUM AND FERRIC CHLORIDE

TECHNICAL FIELD

The present invention relates to a method and an apparatus for recovering indium from an etching waste solution containing indium and ferric chloride, and particularly, to a method and apparatus for recovering valuables, namely indium (In) in the form of an alloy, a metal simple substance or the like from an etching waste solution generated, for example, in the processes for manufacturing flat panel displays such as a liquid crystal display and plasma display.

BACKGROUND ART

Flat panel displays (FPD) such as liquid crystal displays and plasma displays are currently used for many of various electronic devices such as displays for display devices of computers or television image receiving devices and display parts of portable telephones. In a process for manufacturing such an FPD, it is needless to say that waste solutions are produced and it is necessary to treat these waste solutions. This is the same to not only to liquid crystal manufacturing factories where such an FPD is treated but also to semiconductor manufacturing factories and plating factories. Then, there is an etching waste solution containing indium and ferric chloride as one of these waste solutions generated in the processes of manufacturing such an FPD.

Generally, industrial waste solutions sometimes contain various metals. In and the like are contained in waste solutions from liquid crystal manufacturing factories for manufacturing the FPD, copper (Cu), gallium (Ga) and the like are contained in waster solutions from semiconductor manufacturing factories, and nickel (Ni), Cu, zinc (Zn) and the like are contained in waste solutions from plating factories. An attempt is made to recover these metals as valuables. If these metals can be recovered in the form of metal simple substances or alloys, these metals can be, for example, reused.

As conventional technologies for treating waste solutions to recover heavy metals, the coagulation sedimentation treatment, coprecipitation treatment, or the like using chemicals is usually adopted. When the concentration of metals is low, these metals are removed by using an adsorbent. For example, as technologies utilizing the coagulation sedimentation treatment using chemicals, there is the invention described in the following Patent Document 1.

However, when the coagulation sedimentation treatment as mentioned above is applied to the etching waste solution containing indium and ferric chloride, indium can be recovered in the form of indium hydroxide. However, ferric chloride is also precipitated as a hydroxide, resulting in the problem that the amount of sludges of hydroxides generated is increased as a whole. Also, almost all sludges are put into iron-containing sludges, resulting in the problem that these metals are not recovered as valuables.

The present inventors and the like have researched prior art concerning a method of removing or recovering indium from an etching waste solution containing indium and ferric chloride, and as a result, have found that the patent application described in the following Patent Document 2 only exists. Specifically, the invention described in this Patent Document 2 relates to a method for removing or recovering indium, characterized in that iron and a nickel compound are added to an etching waste solution containing indium and ferric chloride as described in claim 1 thereof.

As for specific recovering means, there are the descriptions, in the paragraph [0022] of the specification of Patent Document 2, reading as follows "A nickel compound is added, then iron is added to the waste solution, and the mixture is heated with stirring to precipitate nickel and also indium. From this fact, indium can be removed from the waste solution. In other words, indium can be recovered from the precipitate . . . ". There are also the descriptions in the paragraph [0023], reading as follows "The mixture consisting of indium and nickel precipitated by adding iron to the etching waste solution containing indium and ferric chloride is stuck to iron and can be therefore simply separated from the solution as a precipitate. Examples of a method of separating the precipitate may include the gravity type sedimentation, filtration and methods utilizing centrifugation such as a method using a cyclone.".

Inferring from these descriptions, a nickel precipitation reaction is caused by the addition of nickel ions and this nickel precipitation reaction is accompanied by an indium precipitation reaction in the method of Patent Document 2. Therefore, the recovered indium alloy is much reduced in indium concentration and is recovered in the form of an alloy primarily containing nickel. In this point, Patent Document 2 does not refer to a method of separating the recovered indium alloy. Therefore, though the method as described in Patent Document 2 may be used as technologies for removing indium from a waste solution, the method is unnecessarily regarded as technologies that can be effectively utilized as technologies for recovering only indium as a valuable.

Patent Document 1: JP-A 2005-342694
Patent Document 2: JP-A 2004-75463

DISCLOSURE OF THE INVENTION

Problems to be Solved by the Invention

The present invention has been made for solving such problems, and it is an object of the present invention to provide a method and an apparatus for recovering indium, in which the necessity to recover indium in the form of indium hydroxide can be omitted unlike the conventional methods, indium can be recovered without handling inferiors when in recovering unlike the case of indium hydroxide, it can be recovered easily by a filter or the like and also, the recovery rate of indium is greatly improved.

Means for Solving the Problems

To achieve the above object, the present invention has been made to provide a method and an apparatus for recovering indium from an etching waste solution containing indium and ferric chloride, with regard to the characteristics of a method for recovering indium, there is provided a method for recovering indium from an etching waste solution containing at least indium and ferric chloride, which includes immersing a precipitation-inducing metal which includes zinc and is made into the form of a solid such that any part coming into view three-dimensionally has a longitudinal length of 2.5 to 10 mm in the etching waste solution and allowed to stand, thereby allowing indium contained in the etching waste solution to precipitate on the surface of the precipitation-inducing metal based on a difference in ionization tendency between zinc and indium, detaching the indium precipitated on the surface of the precipitation-inducing metal to recover the indium.

An apparatus for recovering indium is characterized in that this apparatus is used for recovering indium from an etching waste solution containing at least indium and ferric chloride, which includes a reaction vessel 1 that receives the etching waste solution to immerse a precipitation-inducing metal which includes zinc and is made into the form of a solid such that any part coming into view three-dimensionally has a longitudinal length of 2.5 to 10 mm and to allow the solution to stand, thereby allowing indium contained in the etching waste solution to precipitate on the surface of the precipitation-inducing metal based on a difference in ionization tendency between zinc and indium, and a detaching means that detaches the indium precipitated on the surface of the precipitation-inducing metal from the precipitating-inducing metal.

Indium to be recovered in the present invention may be recovered in the form of a metal simple substance and also in the form of an alloy or sometimes, in the form of a compound. Because indium contained in an etching waste solution is usually in the state of ions, compounds or the like, it is difficult to discriminate these materials from each other distinctly and clearly and also these materials are not necessarily discriminated from each other clearly. Therefore, the term "indium" in the present invention may include the case of an alloy or compound besides the case of meaning a metal simple substance.

The precipitation-inducing metal is preferably made into the form of a solid such that any part coming into view three-dimensionally has a longitudinal length of 3 to 4 mm.

The precipitation-inducing metal with indium precipitated on the surface thereof is fluidized in the solution, for example, in the fluidizing apparatus 2 and then, the indium precipitated on the precipitation-inducing metal is detached from the precipitation-inducing metal by a detaching means disposed in the fluidizing apparatus 2, thereby recovering the indium.

The precipitation-inducing metal with indium precipitated on the surface thereof is immersed in hydrochloric acid to dissolve indium in the hydrochloric acid solution, the precipitation-inducing metal is supplied to the fluidizing apparatus 2 while the hydrochloric acid solution in which indium is dissolved is supplied to the fluidizing apparatus 2 to fluidize the precipitation-inducing metal in the hydrochloric acid solution in the fluidizing apparatus 2, then, indium in the hydrochloric acid solution is precipitated again on the precipitation-inducing metal and then, the indium precipitated on the precipitation-inducing metal is detached by a detaching means disposed in the fluidizing apparatus 2, thereby recovering the indium.

As the means for detaching indium from the precipitation-inducing metal, a means for vibrating metal particles by ultrasonic wave may be employed.

Effects of the Invention

The present invention relates to a method in which a precipitation-inducing metal which includes zinc and is made into the form of a solid such that any part coming into view three-dimensionally has a longitudinal length of 2.5 to 10 mm is immersed in an etching waste solution containing indium and ferric chloride and allowed to stand, thereby allowing indium contained in the etching waste solution to precipitate on the surface of the precipitation-inducing metal based on a difference in ionization tendency between zinc and indium, and the indium precipitated on the precipitation-inducing metal is detached and recovered. Therefore, the cementation reaction utilizing a difference in ionization tendency between zinc and indium is combined with the detaching technologies for the recovery of indium from an etching waste solution and specifically, the use of Zn which has higher ionization tendency than indium and is made into a desired size, as the precipitation-inducing metal increases the total surface area of a metal for a metal precipitation reaction and improves the recovery efficiency. The precipitated metal grown to some extent is detached by the detaching means to thereby enable ease of recovery of the precipitated indium by a filter or the like. The precipitation-inducing metal can be reused since a new metal surface is exposed by detaching indium.

In the case of an etching waste solution containing indium and ferric chloride which are the subjects of the present invention, the concentration of ferric chloride is usually as very high as 30% by weight or more. When intending to apply the cementation reaction utilizing ionization tendency, the dissolution reaction of the precipitation-inducing metal is so strong that it is difficult to control the reduction precipitation reaction. Iron and indium are precipitated on the surface of zinc and hence, the zinc particles are all dissolved before a zinc dissolution reaction is terminated, with the result that the precipitated indium is dissolved again, with the result that no indium can be recovered. In the present invention, on the contrary, zinc made into the form of a solid such that any part coming into view three-dimensionally has a longitudinal length of 2.5 to 10 mm is used as the precipitation-inducing metal and is immersed in an etching waste solution and allowed to stand, as described above. Therefore, the dissolution reaction of precipitation-inducing metal is not so strong that it is not difficult to control a reduction-precipitation reaction and also, the precipitation-inducing metal is not dissolved more than required. Such an idea occurs that aluminum is used as the precipitation-inducing metal. However, because the temperature is raised by an exothermic reaction caused by the dissolution of aluminum, the dissolution rate is more increased, which more raises the temperature and thus, the increase in dissolution rate and the rise in temperature are repeated, with the result that aluminum is dissolved with increasing speed, which makes it difficult to control the reaction. Therefore, aluminum cannot be used. On the other hand, zinc produces not so much dissolution reaction as aluminum, making it easy to control the reaction and therefore, zinc can be preferably used as the precipitation-inducing metal in the present invention.

When the precipitation-inducing metal is formed into a three-dimensional structure such that any part coming into view three-dimensionally has a longitudinal length of 3 to 4 mm, the aforementioned effect is more produced.

Unlike the conventional methods, it is unnecessary to recover indium in the form of a precipitate of indium hydroxide, and also, indium can be recovered as one isolated from the precipitation-inducing metal even in the case where indium is recovered in the form of an alloy. Therefore, the method of the present invention has such an effect that it is free from handling inferiors unlike the case of indium hydroxide in the recovering operation and can be easily recovered by using, for example, a filter.

As mentioned above, the present invention can provide a method of efficiently recovering indium and therefore, the present invention has the advantage that it can be applied as a method of recovering indium in the recycle process in the recycle factory of liquid crystal televisions even in the case where the recovery recycle of FPDs and the like is legally obligated in the future, for example, by a household electric appliances-recycle law or a corresponding law.

DESCRIPTION OF REFERENCE NUMERALS

1 Reaction vessel
2 Fluidizing apparatus
4 Dissolving vessel

BEST MODE FOR CARRYING OUT THE INVENTION

The present invention will be explained in detail with reference to the drawings.

Embodiment 1

Figure 1:
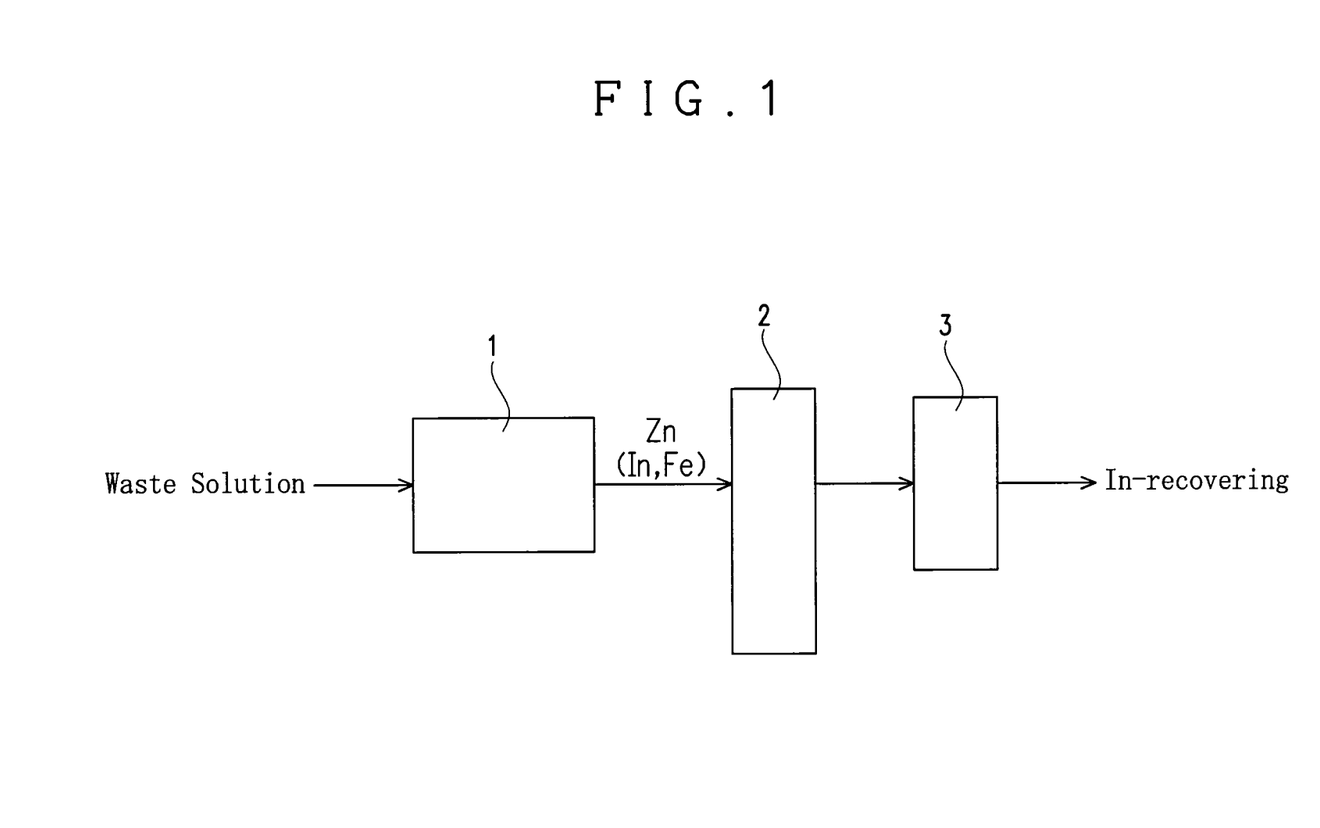
FIG. 1 is a schematic block diagram of an apparatus for recovering indium from an etching waste solution containing indium and ferric chloride in one embodiment.

An apparatus of this embodiment for recovering indium (In) from an etching waste solution containing indium and ferric chloride is provided with a reaction vessel 1, a fluidizing apparatus and a filter 3 as shown in FIG. 1.

The reaction vessel 1 serves to receive an etching waste solution to immerse a precipitation-inducing metal in the etching waste solution and to allow to stand, thereby causing a reaction for precipitating In from the waste solution by the cementation reaction (metal precipitation reaction) based on a difference in ionization tendency between the precipitation-inducing metal and indium as explained later. A columnar one having a diameter of 3.5 mm and a length of 3.5 mm and including zinc (Zn) is used as the precipitation-inducing metal in this embodiment.

The fluidizing apparatus 2 serves to fluidize the precipitation-inducing metal with In precipitated thereon in a solution to detach the In precipitated on the precipitation-inducing metal. The filter 3 serves to separate and recover the In detached in the fluidizing apparatus 2. In this case, a structure may be adopted in which the separated solution can be returned to the fluidizing apparatus 2. In the case of adopting the structure in which the separated process solution can be returned to the fluidizing apparatus 2, a pump or the like that circulates a solution to be processed is required. In this embodiment, it is preferable to utilize water as the solution that fluidizes the precipitation-inducing metal in the fluidizing apparatus 2 from the viewpoint of handling, though no particular limitation is imposed on the solution. The precipitation-inducing metal from which In has been detached may be returned to the reaction vessel to reuse. It is to be noted that the precipitation-inducing metal is reduced in diameter (or length) after the precipitation operation is carried out several times, so that indium cannot be precipitated and recovered. It is therefore preferable to replace the precipitation-inducing metal with a new precipitating-inducing metal after the precipitation-inducing metal is precipitated several times.

When the precipitation-inducing metal is exchanged, it is unnecessary to exchange all the precipitation-inducing metal. A structure may be adopted in which only metal particles having a size larger than a predetermined size (2.5 mm or more and preferably 3 mm or more) are recovered by screening utilizing a vibrating screen or the like and new precipitation-inducing metal particles are added to the recovered metal particles, which are then returned to the reaction vessel.

Figure 2:
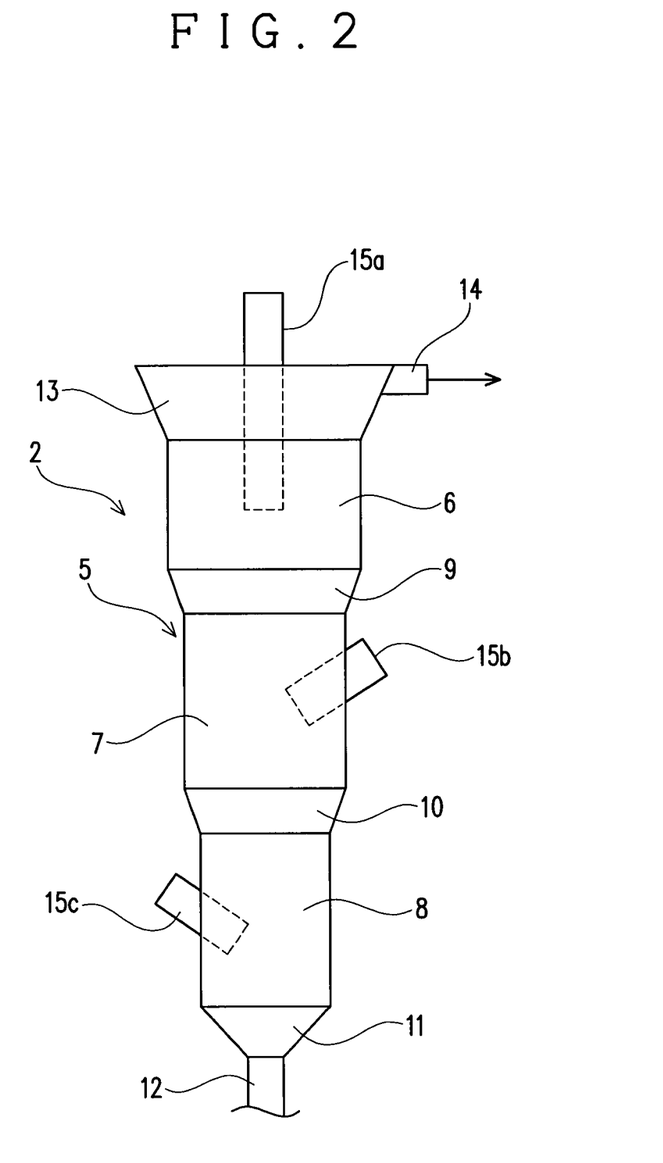
FIG. 2 is a schematic front view of a fluidizing apparatus in the apparatus for recovering indium.

The apparatus body 5 of the fluidizing apparatus 2 is an oblong type as shown in FIG. 2 and is constituted of an apparatus upper part 6, an apparatus middle part 7 and an apparatus lower part 8, which are each connected via connecting parts 9 and 10. Although the apparatus upper part 6, apparatus middle part 7 and apparatus lower part 8 are respectively formed in the same width, they are formed such that the sectional area of the apparatus upper part 6 is larger than the sectional area of the apparatus middle part 7 and the sectional area of the apparatus middle part 7 is larger than the sectional area of the apparatus lower part 8. As a result, the apparatus 1 has a structure in which the sectional area of the apparatus body 5 is discontinuously increased towards the upper side as a whole. In this case, the connecting parts 9 and 10 are formed in a taper form spread upward.

An intake chamber 11 having a substantially cone shape for introducing water which is a liquid for fluidizing the precipitation-inducing metal is installed on the lower side of the apparatus lower part 8 and an intake tube 12 is installed at the lower part of the intake chamber 11. The intake tube 12 is provided with a check valve though not shown. Also, an upper chamber 13 is installed on the upper side of the apparatus upper part 6 and a discharge pipe 14 that discharges the recovered flake or microparticle In which is a recovery subject metal is installed on the side of the upper chamber 13.

The upper chamber 13 is a part that discharges the metal (In) recovered through the discharge tube 14 and also a part for introducing Zn which is the precipitation-inducing metal with In precipitated thereon by the so-called cementation reaction (metal precipitation reaction) caused based on a difference in ionization tendency between the precipitation-inducing metal and In in the reaction vessel 1. The apparatus is so structured that until water introduced from the intake tube 12 reaches the discharge tube 14, the water flows upward and a fluidized bed is formed by Zn particles. Moreover, ultrasonic wave oscillators 15a, 15b and 15c which are the detaching means that detaches In which is the recovery subject metal precipitated on Zn particles in the reaction vessel 1 are installed on the apparatus upper part 6, apparatus middle part 7 and apparatus lower part 8, respectively.

Explained is a method for recovering In by the apparatus for recovering In which has such a structure, first a waste solution to be treated is supplied to the reaction vessel 1.

Next, a precipitation-inducing metal (metal particles) which has a columnar form having a diameter of 3.5 mm and a length of 3.5 mm and includes Zn is immersed in the etching waste solution supplied to the reaction vessel 1 and allowed to stand. Then, a so-called cementation reaction based on a difference in ionization tendency between In contained in the waste solution and the metal particles immersed and allowed to stand, that is, Zn particles, is caused. To explain this in more detail, the reduction reaction of each metal ion is as shown in the following equations (1) and (2), showing the standard electrode potential ($E^0$) of each metal ion. Since ferric chloride is contained in the waste solution and Fe also participates in the cementation reaction, the reduction reaction of Fe ions is shown in the following equation (3) and its standard electrode potential ($E^0$) is also shown.

$$In^{3+}+3e \rightarrow In \qquad (1) -0.34\,V$$

$$Zn^{2+}+2e \rightarrow Zn \qquad (2) -0.76\,V$$

$$Fe^{2+}+2e \rightarrow Fe \qquad (3) -0.44\,V$$

As is clear from above (1) to (3), the standard reduction potential of $Zn^{2+}$ is smaller than the standard reduction potentials of $In^{3+}$ and $Fe^{2+}$. In other words, the ionization tendency of Zn is larger than those of In and Fe. Therefore, in the situation where the precipitation-inducing metal including Zn is immersed and allowed to stand, Zn having a lager ionization tendency is ionized into $Zn^{2+}$ and eluted in the waste solution and, at the same time, $In^{3+}$ contained in the waste solution is deionized into In and $Fe^{2+}$ is deionized into Fe, and these In and Fe are precipitated on the surface of the Zn particles.

In this case, ferric chloride is contained in the etching waste solution, and therefore, if the concentration of ferric chloride is high, the dissolution reaction of the precipitation-inducing particles is strong when the cementation reaction is produced. Accordingly, there is a fear that it is difficult to control the reduction-precipitation reaction. The precipitation-inducing metal is all dissolved, so that no indium can be recovered. Because, for instance, aluminum (Al) has a higher ionization tendency than In and Fe, aluminum may be used to cause the cementation reaction to thereby precipitate In and Fe. However, Al induces a strong dissolution reaction of particles and therefore, it is difficult to control the reduction-precipitation reaction, showing that Al cannot be practically used as the precipitation-inducing metal.

In this embodiment, however, Zn is used as the precipitation-inducing metal and also, the precipitation-inducing metal including Zn is made into a columnar form having a diameter of 3.5 mm and a length of 3.5 mm. Therefore, the dissolution reaction of the precipitation-inducing metal is not so strong and it is therefore not difficult to control the reduction-precipitation reaction. The precipitation-inducing metal is not all dissolved, making it possible to recover In. The cementation reaction ensures that the precipitate is obtained in the form precipitated as an alloy of In and Fe on the surface of Zn particles. The In alloy can be detached from the surface of the Zn particles by a detaching means as explained later and can be easily separated by a filter. 90% by weight or more of In in the etching waste solution can be recovered.

As the precipitation-inducing metal, in this embodiment, a small columnar one having a diameter of 3.5 mm and a length of 3.5 mm is used, and therefore, the surface area of Zn which causes the cementation reaction is increased, bringing about a larger In precipitation part as compared with the case of a Zn scrap is introduced into the reaction vessel 1, thereby making it possible to improve recovery efficiency. After the precipitation of metals grown to some extent is observed, the precipitation-inducing metal is transferred to the fluidizing apparatus where the precipitated metals are forcedly detached by the ultrasonic vibration as mentioned later, whereby a new metal surface (surface of Zn particles) can be exposed. The precipitation-inducing metal after the detaching process can be returned to the reaction vessel, which allows the precipitation of In on the surface of the metal (surface of Zn particles) and therefore, the precipitation-inducing metal can be reused. An indium alloy can be detached, separated and recovered more easily from the surface of Zn in contrast with the case of the conventional methods.

Next, water is introduced into the apparatus body 5 of the fluidizing apparatus 2 from the intake tube 12 through the intake chamber 11. On the other hand, the precipitation-inducing metal including Zn on which an alloy of In and Fe is precipitated in the reaction vessel 1 is introduced into the apparatus body 5 from the upper chamber 13. In this case, the precipitation-inducing metal including Zn on which an alloy of In and Fe is precipitated is removed to thereby remove In from the waste solution, and ferric chloride in the resulting process solution is reused as, for example, a coagulant.

In the apparatus body 5, the precipitation-inducing metal introduced from the upper chamber 13 is in a fluidized state so as to form a fluidized bed while the introduced water flows upward in a vertical direction. In this case, the precipitation-inducing metal originally has a sphere form having a diameter of 3.5 mm as mentioned above. However, the precipitation-inducing metal is consumed to some extent by the cementation reaction in the above reaction vessel 1, in which the precipitation-inducing metal is immersed and allowed to stand, and therefore, eventually has a particle diameter of about 2 to 3 mm when it is introduced into the apparatus body 5 of the fluidizing apparatus 2.

The ultrasonic oscillators 15a, 15b and 15c are allowed to operate with fluidizing the precipitation-inducing metal in this manner. When these ultrasonic oscillators 15a, 15b and 15c are operated, ultrasonic wave produced by the oscillation of the ultrasonic oscillators 15a, 15b and 15c give oscillation force and agitation force to the Zn particles with In precipitated thereon, to thereby forcedly detach the precipitated In from these Zn particles resultantly.

In the case of utilizing an ultrasonic oscillation for detaching the precipitated In in this manner, the existence of the ultrasonic oscillator can be visually confirmed on the reactor part from the outward appearance of the treating apparatus. Also, even in the case where the existence of the ultrasonic oscillator cannot be visually confirmed, it is easily confirmed that treatment utilizing ultrasonic wave is performed because high noises at about ten to twenty kHz are generated when Zn or Al metal particles are made to be in contact with each other and oscillated by the ultrasonic wave oscillator during treatment.

The process solution containing the In detached in this manner is discharged out of the apparatus body 5 from the upper chamber 13 through the discharge tube 14, In is separated by the filter 3 and the separated In is recovered resultantly.

In the initial stage at which metal particles are introduced into the apparatus body 5, the metal particles are in such a state that In and Fe are precipitated on the precipitation-inducing metal including Zn. However, while these metal particles are fluidized in the apparatus body 5, In and Fe are gradually detached and therefore, the particle diameter of the metal particles introduced into the upper chamber 13 is inevitably reduced with time and becomes smaller than that in the initial stage at which the metal particles are introduced into the reaction vessel. As a result, because, originally, the waste solution flows upward at almost the same flow rate in the apparatus body 5, there is a fear that the metal particles whose particle diameter is decreased as the waste solution comes closer to the top overflow unexpectedly from the apparatus body 5.

However, since the apparatus body 5 is formed such that its sectional area is discontinuously increased with decrease in distance from the top of the apparatus body 5 in this embodiment, the upward flow rate of the waste solution in the apparatus body 5 is gradually decreased and therefore, the metal particles reduced in particle diameter by the detachment of In and Fe as mentioned above do not unexpectedly overflow from the upper part of the apparatus body 5 whose sectional area increases but are kept within the apparatus body 5 highly possibly.

Such a structure may be adopted in which the metal particles introduced into the apparatus body 5 are taken out of the upper chamber 13 after In is detached. The apparatus may also have such a structure in which a discharge port for discharging the precipitation-inducing metal is disposed at the lower part of the apparatus or a structure in which the precipitation-inducing metal is drawn out of the system by utilizing the intake tube 12. If the precipitation-inducing metal is drawn from the lower part of the apparatus, the precipitation-inducing metal having a larger diameter can be taken out and can be reused properly by returning the precipitation-inducing metal having a larger diameter to the reaction vessel.

Only required for the detaching apparatus in this embodiment is to detach an In alloy from Zn particles to thereby separate and recover the In alloy, and the shape of the detaching apparatus is not limited to those mentioned above.

According to the present invention, the etching waste solution is not diluted and therefore, the treating cost of the waste solution is not increased with increase in the volume of the waste solution by the dilution, making it possible to suppress an increase in cost for waste treatment.

Embodiment 2

Figure 3:
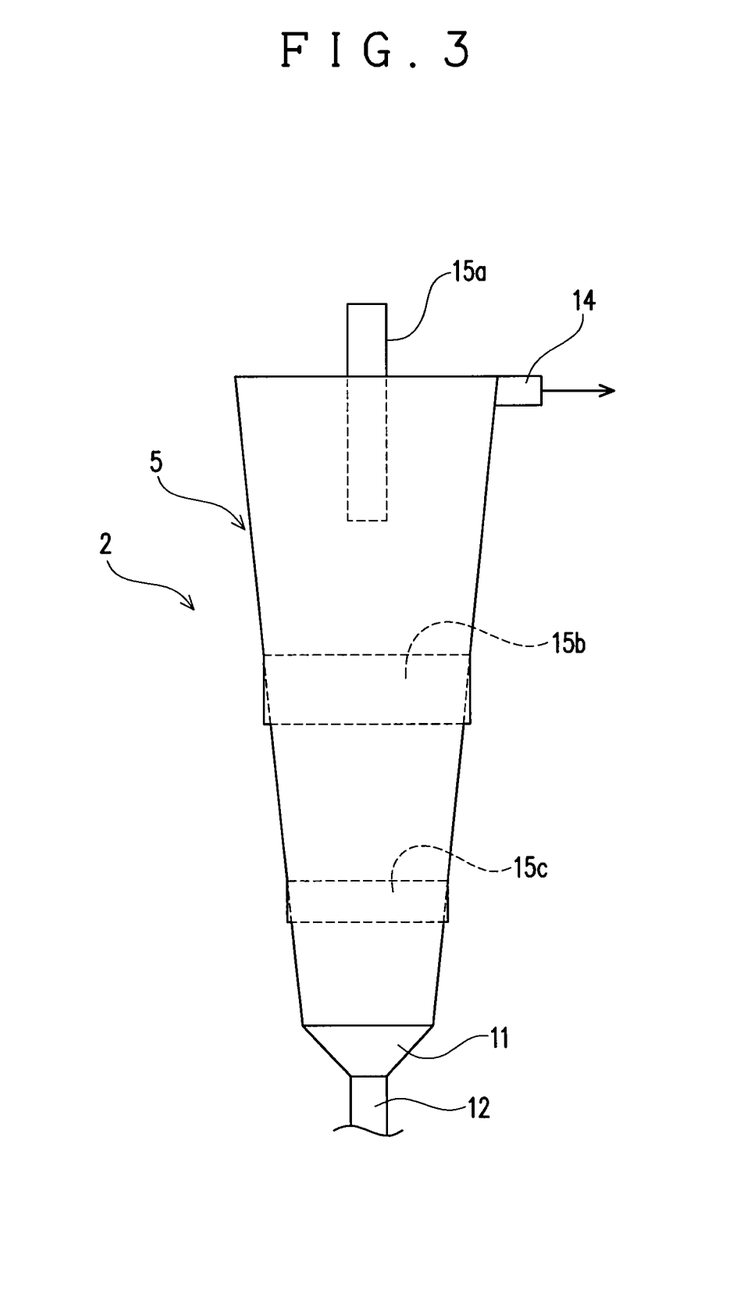
FIG. 3 is a schematic front view of a fluidizing apparatus in another embodiment.

This embodiment is different from the embodiment 1 in the structure of the apparatus body 5. Specifically, in this embodiment, an apparatus body 5, as shown in FIG. 3, has a structure in which the entire peripheral surface forms a taper spread upward, so that the sectional area of the apparatus body 5 is increased continuously with decrease in distance from the top of the apparatus body 5. This embodiment 2 is different in this point from the embodiment 1 in which the sectional area of the apparatus body 5 is discontinuously increased with decrease in distance from the top of the apparatus body 5. Since the apparatus body 5 of the this embodiment is structured such that it is not discontinuously but continuously increased in its sectional area, the apparatus body 5 of this embodiment is not divided into the apparatus upper part 6, the apparatus middle part 7 and the apparatus lower part 8 in its structure unlike the embodiment 1.

However, this embodiment is in common with the embodiment 1 in the point that the ultrasonic oscillators 15a, 15b and 15c are installed at three points extending from the upper part to lower part of the apparatus body 5. Accordingly, also in this embodiment, such an effect is obtained that In precipitated as the recovery subject metal on the metal particles (Zn) of the precipitation-inducing metal can be forcedly detached by the ultrasonic wave from the ultrasonic oscillators 15a, 15b and 15c.

Also, though there is a difference in whether the increase in sectional area is continuous or discontinuous, this embodiment is in common with the embodiment 1 in the point that the sectional area is increased in the direction of the upper part of the apparatus body 5. Therefore, also in this embodiment, fine metal particles decreased in particle diameter are kept at the upper part of the apparatus body 5, producing such an effect that the phenomenon that the metal particles unexpectedly overflow over the apparatus body 5 can be prevented.

Embodiment 3

Figure 4:
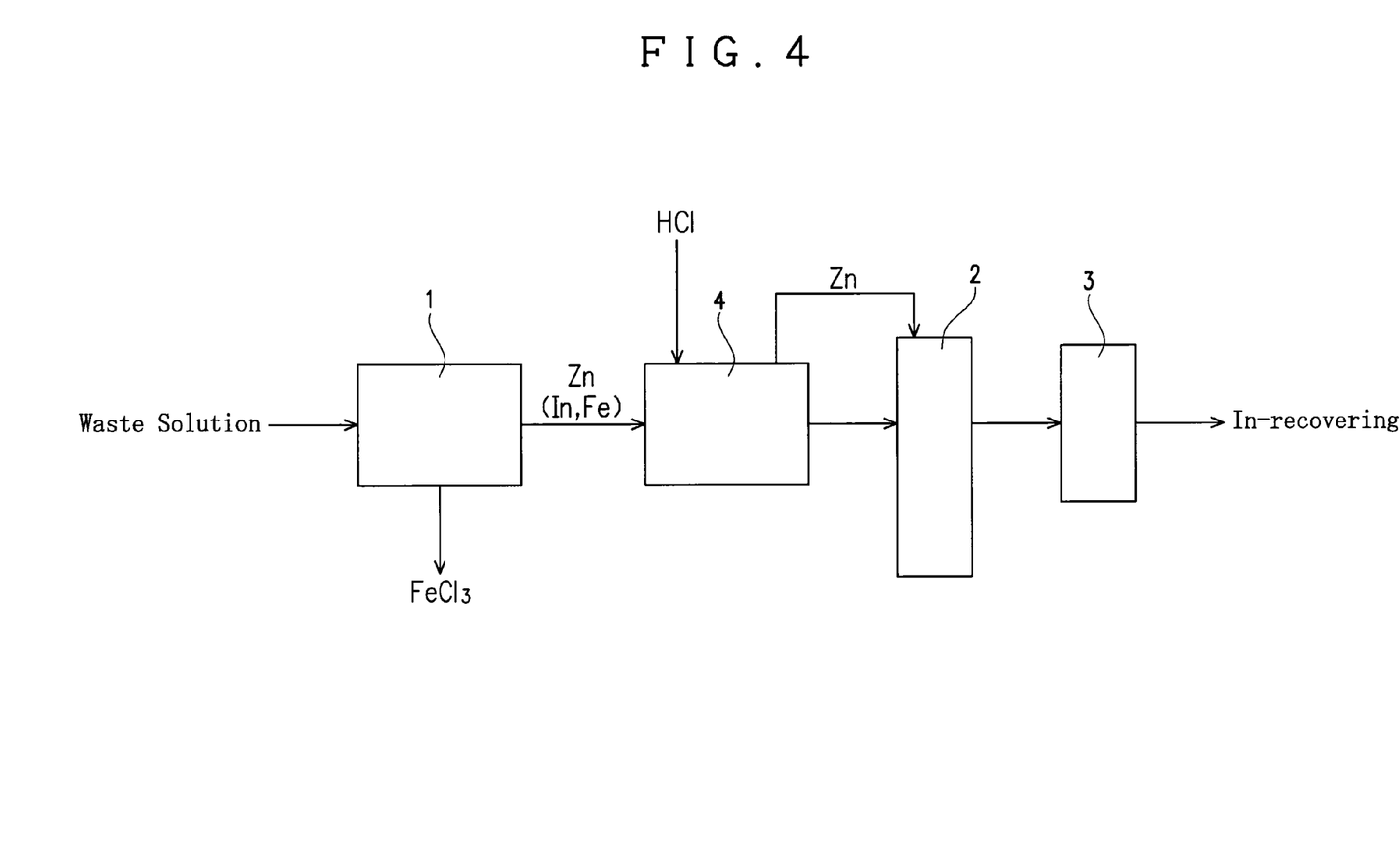
FIG. 4 is a schematic block diagram of an apparatus for recovering indium in another embodiment.

In this embodiment, as shown in FIG. 4, a dissolving vessel 4 is installed on the downstream side of the reaction vessel 1 and the upstream side of the fluidizing apparatus 2, and this embodiment differs in this point from the embodiment 1 provided with no dissolving vessel 4.

Specifically, in this embodiment, the precipitation-inducing metal which includes Zn and on which In and Fe have been precipitated in the reaction vessel 1 is not directly supplied to the fluidizing apparatus 2 to detach an alloy of In and Fe, but is supplied to the dissolving vessel 4 to dissolve In and Fe precipitated on the precipitation-inducing metal in the dissolving vessel 4. The dissolved In and Fe are again precipitated in the fluidizing apparatus 2. For this, the fluidizing apparatus 2 has not only a function of fluidizing the precipitation-inducing metal to detach an alloy of In and Fe but also a function as a reactor that precipitates In and Fe dissolved in the dissolving vessel 4, again on the precipitation-inducing metal by the same cementation reaction that is run in the reaction vessel 1.

To explain in more detail, the apparatus for recovering In in this embodiment is, as shown in FIG. 4, provided with the reaction vessel 1, the dissolving vessel 4, the fluidizing apparatus 2 and the filter 3. The structures of the reaction vessel 1, fluidizing apparatus 2 and filter 3 are the same as those in the embodiment 1. Though the operation performed to precipitate In and Fe on the precipitation-inducing metal in the reaction vessel 1 is the same as that in the above embodiment 1, the precipitation-inducing metal is supplied to the dissolving vessel 4 and the In and Fe precipitated on the precipitation-inducing metal are dissolved in the dissolving vessel 4.

Hydrochloric acid is received in advance in the dissolving vessel 4. As the hydrochloric acid, highly concentrated (for example, concentrated hydrochloric acid having a concentration of 20% by weight) hydrochloric acid is used. At the beginning, hydrochloric acid is received in a small amount in the dissolving vessel 4, the precipitation-inducing metal is immersed in hydrochloric acid having a high concentration to dissolve In and Fe in the hydrochloric acid having a high concentration and then, the hydrochloric acid having a high concentration is diluted to adjust the hydrochloric acid to pH 0.5 to 3.0.

In and Fe are dissolved in this manner and the hydrochloric solution adjusted to a desired pH is supplied to the fluidizing apparatus 2 on the downstream side. As a result of the dissolution of In and Fe, the precipitation-inducing metal includes the original one including only Zn and this precipitation-inducing metal including only Zn is also supplied to the fluidizing apparatus 2. The hydrochloric acid in which In and Fe are dissolved is made to flow into the apparatus body 5 from the intake tube 12 of the apparatus body 5 of the fluidizing apparatus 2 through the intake chamber 11. The precipitation-inducing metal including Zn is introduced into the apparatus body 5 from the upper chamber 13 of the apparatus body 5.

The precipitation-inducing metal is put into a fluidized state so as to form a fluidized bed in the hydrochloric acid solution in the apparatus body in the same manner as in embodiment 1. In this embodiment, however, In and Fe are dissolved in the hydrochloric acid solution and therefore, the same cementation reaction that is produced in the reaction vessel 1 is also produced in the fluidizing vessel 2. The action of the cementation reaction is the same as that explained for the reaction vessel 1 of the embodiment 1 and therefore, detailed explanations of this action is omitted.

In and Fe are precipitated again in the hydrochloric acid solution by this cementation reaction. The precipitated In and Fe are forcedly detached from Zn particles by the ultrasonic oscillators 15a, 15b and 15c while fluidizing the precipitation-inducing metal. This point is the same as embodiment 1. The process solution containing the detached In is discharged out of the apparatus body 5, then, the precipitated In is separated by the filter 3 and recovered. This is also the same as that of the embodiment 1 in terms of recovering the separated In.

In this embodiment, as mentioned above, the precipitation-inducing metal with In and Fe precipitated thereon in the reaction vessel 1 is supplied to the dissolving vessel 4, immersed in hydrochloric acid having a high concentration to thereby dissolve In and Fe and then, In and Fe are again precipitated on the precipitation-inducing metal in the fluidizing apparatus 2. Therefore, the concentration (content) of In in the alloy can be increased, producing such an effect that an alloy having highly concentrated indium can be easily obtained.

Although, in this embodiment, the Zn particles left after In is dissolved again are utilized as the precipitation-inducing metal used in the fluidizing apparatus on the downstream side, the precipitation-inducing metal is not limited to this and Zn particles may be separately added as the precipitation-inducing metal.

In this embodiment, Zn is utilized as the metal that precipitates In from the hydrochloric acid in which the In obtained after dissolved again is dissolved. However, the present invention is not limited by this and Al particles may be used. This reason is that since the hydrochloric acid solution containing In is adjusted to pH 0.5 to 3.0, the dissolution reaction can be restricted even if Al is utilized, with the result that In can be precipitated and recovered. Also, concentrated hydrochloric acid having a concentration of 10% by weight or more can be utilized as the highly concentrated hydrochloric acid utilized as the solution for again dissolving In and Fe precipitated on Zn particles. Also, sulfuric acid having a high concentration may be used in place of hydrochloric acid.

Other Embodiments

In the above embodiments, the precipitation-inducing metal is made into a columnar form having a diameter of 3.5 mm and a length of 3.5 mm. However, the diameter and length of the precipitation-inducing metal are not limited to those defined in above embodiments. The essential thing is to form the precipitation-inducing metal having a size of 2.5 mm to 10 mm. If the diameter or length of the precipitation-inducing metal is less than 2.5 mm, there is a fear that Zn which is the precipitation-inducing metal is dissolved and consumed to some extent by the cementation reaction before In and Fe are precipitated. The diameter and length of the precipitation-inducing metal is preferably 3 mm or more from this point of view.

If the diameter or length of the precipitation-inducing metal exceeds 10 mm, the number of precipitation-inducing metal particles which can be retained in the reaction vessel 1 or the fluidizing apparatus 2 is decreased, with the result that the total surface area of the precipitation-inducing metal particles is reduced and there is therefore a fear as to a reduction in precipitation reaction efficiency. Also, the diameter or length of the precipitation-inducing metal exceeds 10 mm, the precipitation-inducing metal is not easy to be fluidized in the fluidizing apparatus 2, with the result that there is a fear that In is detached inefficiently. The diameter or length of the precipitation-inducing metal is preferably 4 mm or less from this point. Therefore, the diameter or length of the precipitation-inducing metal is preferably 2.5 to 10 mm and more preferably 3 to 4 mm.

In the case of, particularly, the embodiment 3, it is preferable to utilize the precipitation-inducing metal having a size falling the above range from the viewpoint of carrying out the precipitation and detachment of In efficiently in the fluidizing apparatus.

In above embodiment, a columnar one is used as the precipitation-inducing metal. The shape of the precipitation-inducing metal is not also limited to a columnar shape and may be, for example, a sphere, cubic, rectangular parallelopiped or prism shape. When the precipitation-inducing metal is formed into a sphere shape, the diameter is 2.5 to 10 mm and more preferably 3 to 4 mm, when the precipitation-inducing metal is formed into a cubic shape, the length of one side of the cubic is 2.5 to 10 mm and more preferably 3 to 4 mm, and when the precipitation-inducing metal is formed into a prism shape, the length of the minimum short side is 2.5 to 10 mm and more preferably 3 to 4 mm and also, the length of the maximum long side is 2.5 to 10 mm and more preferably 3 to 4 mm. In other words, it is necessary to form the precipitation-inducing metal such that the longitudinal length of any part of a three-dimensional body constituting the precipitation-inducing metal coming into view three-dimensionally is to be 2.5 to 10 mm.

Here, the description "the longitudinal length of any part of a three-dimensional body constituting the precipitation-inducing metal coming into view three-dimensionally" means the longitudinal length of each part on a plane drawing viewed when making a projected plan of a three-dimensional body constituting the precipitation-inducing metal, and the definition "the longitudinal length of any part coming into view three-dimensionally be 2.5 to 10 mm" brings about the result that even in the case of making the above projected drawing as viewed from any angle, the dimension of any part of a plane drawing coming into view on the projected drawing is in a range from 2.5 to 10 mm. Accordingly, in the case of a three-dimensional body, such as above prism shape, the dimensions of the length, width and height are three-dimensionally different from each other, it is necessary that the dimension of the minimum short side is to be 2.5 mm or more and also, the dimension of the maximum long side is to be 10 mm or less.

The fluidizing apparatus 2 may be only used to simply fluidize the precipitation-inducing metal like that used as in the embodiment 1, or may be so structured as to have not only a function of fluidizing the precipitation-inducing metal but also a function of causing the cementation reaction for precipitating In and the like on the precipitation-inducing metal like that used as in the embodiment 3.

The use of the fluidizing apparatus 2 enables the precipitated In and the like to be detached from the precipitation-inducing metal. However, it is not an essential condition to use the fluidizing apparatus 2.

In above embodiments 1 to 3, the apparatus body 5 of the fluidizing apparatus 2 is formed such that the sectional area of the apparatus is increased with decrease in distance from the top and therefore, the preferable effect is obtained. However, it is not an essential condition to form the apparatus body 5 like this.

The means that detaches the recovery subject metal from metal particles is not limited to a means using ultrasonic wave which is used in above Examples 1 to 3 and may be other means.

Example 1

500 g of Zn particles having a diameter of 3 mm and a length of 3 mm were introduced into 1 L of a waste solution in which the concentration of ferric chloride was 35% by weight and 220 mg/L of In was contained, allowed to stand for 24 hours and immersed. The concentration of In in the ferric chloride waste solution after treatment was 4 mg/L and therefore, 98% by weight or more of In could be removed from the etching waste solution.

Figure 5:
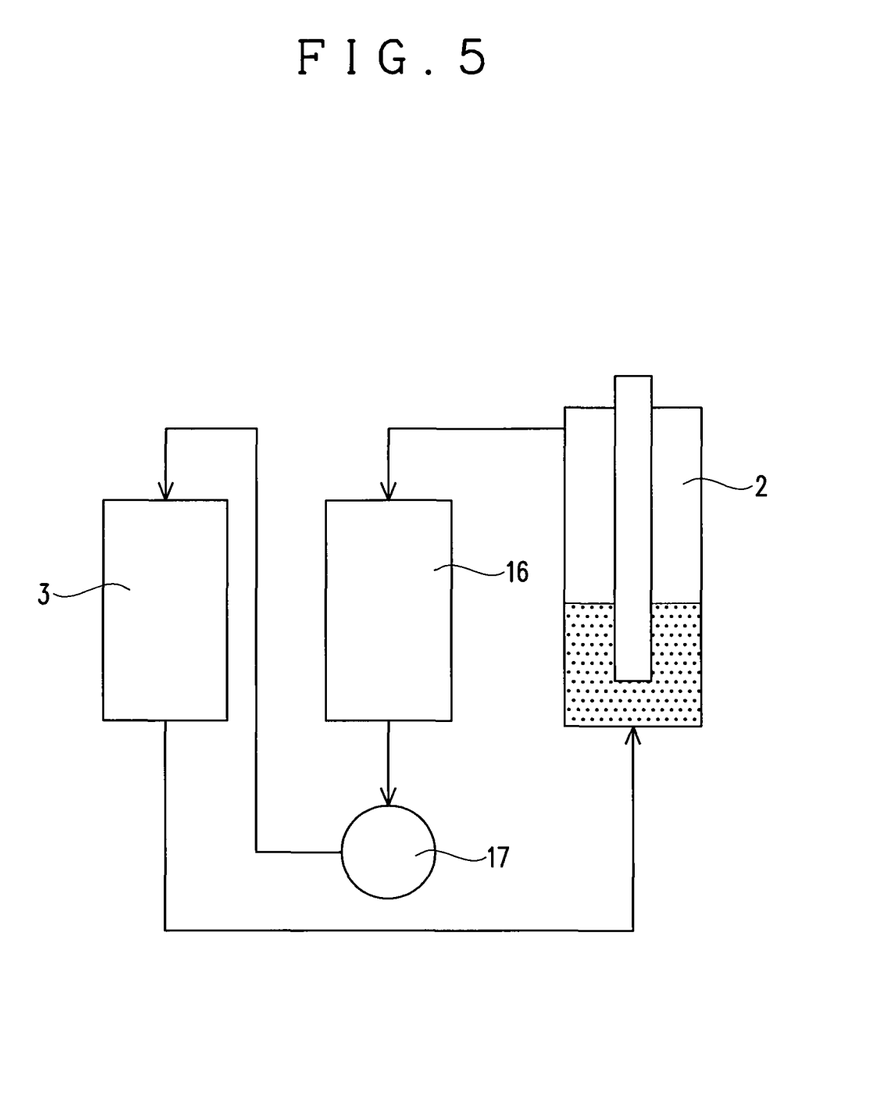
FIG. 5 is a schematic block diagram of an apparatus for recovering indium which is used in an example.

This treatment was repeated to produce 10 batches of products, thereby obtaining Zn particles on which In and a Fe alloy were precipitated in a total of 5 kg. Then, an operation was performed for recovering In by using an apparatus provided with a fluidizing apparatus 2, a tank 16, a pump 17 and a filter 3 as shown in FIG. 5.

Specifically, using a cylinder type small resin reactor having a diameter of 10 cm, which is provided with an ultrasonic vibrator, as the fluidizing apparatus 2, the Zn particles were introduced in the fluidizing apparatus 2. 5 L of water was circulated in the passage of the apparatus provided with the tank 16, pump 17 and the like to carry out treatment and then, In and a Fe alloy were recovered by detachment using the filter 3 to thereby obtain an In recovery product.

Example 2

The Zn particles on which In and a Fe alloy were precipitated in a total of 5 kg and which were obtained in Example 1 were immersed in 500 mL of concentrated hydrochloric acid having a concentration 20% to dissolve the In and Fe alloy precipitated on the surface of the Zn particles. The obtained hydrochloric acid solution containing In and Fe dissolved therein was diluted to prepare 5 L of a hydrochloric acid solution, which was then adjusted to pH 0.5 to 3.0. Then, an operation was performed for recovering In by using an apparatus provided with a fluidizing apparatus 2, a tank 16, a pump 17 and a filter 3 as shown in FIG. 5 in the same manner as in Example 1.

Specifically, Zn particles on which In and Fe were not precipitated were introduced in the fluidizing apparatus 2 to circulate the hydrochloric acid solution for 120 minutes by utilizing the pump 17. In the fluidizing apparatus 2, In dissolved in the solution was precipitated on the surface of the Zn particles by the cementation reaction. The precipitated In alloy could be easily detached from the Zn particles by utilizing a ultrasonic wave oscillator disposed in the fluidizing apparatus 2 and easily recovered by the filter 3 on the downstream side. The ultrasonic treatment was carried out once every 2 minutes for 2 seconds every treatment.

As a result, the recovery rate of In from the hydrochloric acid solution was 95% by weight. The ratio of In to Fe in the recovered In alloy was In:Fe=9:1, making possible to recover as an In alloy having a high concentration of In.

The invention claimed is:

1. A method for recovering indium from an etching waste solution containing at least indium and ferric chloride, comprising immersing a precipitation-inducing metal which includes zinc and is made into the form of a solid such that any part coming into view three-dimensionally has a longitudinal length of 2.5 to 10 mm in the etching waste solution and allowed to stand, thereby allowing indium contained in the etching waste solution to precipitate on the surface of the precipitation-inducing metal based on a difference in ionization tendency between zinc and indium, detaching the indium precipitated on the precipitation-inducing metal to recover the indium, immersing the precipitation-inducing metal with indium precipitated on the surface thereof in hydrochloric acid to dissolve indium in the hydrochloric acid, supplying the hydrochloric acid solution with indium dissolved therein and the precipitation-inducing metal to a fluidizing apparatus which fluidizes the precipitation-inducing metal in the hydrochloric acid solution with indium dissolved therein and thereby fluidizing the precipitation-inducing metal in the hydrochloric acid solution in the fluidizing apparatus, precipitating indium again on the surface of the precipitation-inducing metal based on a difference in ionization tendency between zinc and indium, and detaching the indium precipitated on the precipitation-inducing metal to recover the indium.

2. The method for recovering indium according to claim 1, wherein the precipitation-inducing metal is made into the form of a solid such that any part coming into view three-dimensionally has a longitudinal length of 3 to 4 mm.

3. The method for recovering indium according to claim 1, wherein the detaching the indium from the precipitation-inducing metal includes vibrating metal particles by ultrasonic wave.

4. An apparatus for recovering indium from an etching waste solution containing at least indium and ferric chloride, comprising a reaction vessel that receives the etching waste solution to immerse a precipitation-inducing metal which includes zinc and is made into the form of a solid such that any part coming into view three-dimensionally has a longitudinal length of 2.5 to 10 mm and to allow the solution to stand, thereby causing a reaction for precipitating indium contained in the etching waste solution on the surface of the precipitation-inducing metal based on a difference in ionization tendency between zinc and indium, a dissolving vessel in which the precipitation-inducing metal with indium precipitated on the surface thereof is immersed in hydrochloric acid to thereby dissolve indium in the hydrochloric acid solution, a fluidizing apparatus which is supplied with the hydrochloric acid solution containing indium dissolved in the dissolving vessel and the precipitation-inducing metal and fluidizes the precipitation-inducing metal in the hydrochloric acid solution, thereby precipitating indium in the hydrochloric acid solution again on the precipitation-inducing metal based on a difference in ionization tendency between zinc and indium, and a detaching means that detaches the indium precipitated on the surface of precipitation-inducing metal from the precipitating-inducing metal.

5. The apparatus for recovering indium from an etching waste solution containing indium and ferric chloride according to claim 4, wherein the means for detaching indium from the precipitation-inducing metal is a means for vibrating metal particles by ultrasonic wave.

* * * * *